Oct. 11, 1966     R. E. PEARSON     3,278,935
APPARATUS FOR CALIBRATING AND TESTING RADAR EQUIPMENT
Filed July 13, 1964
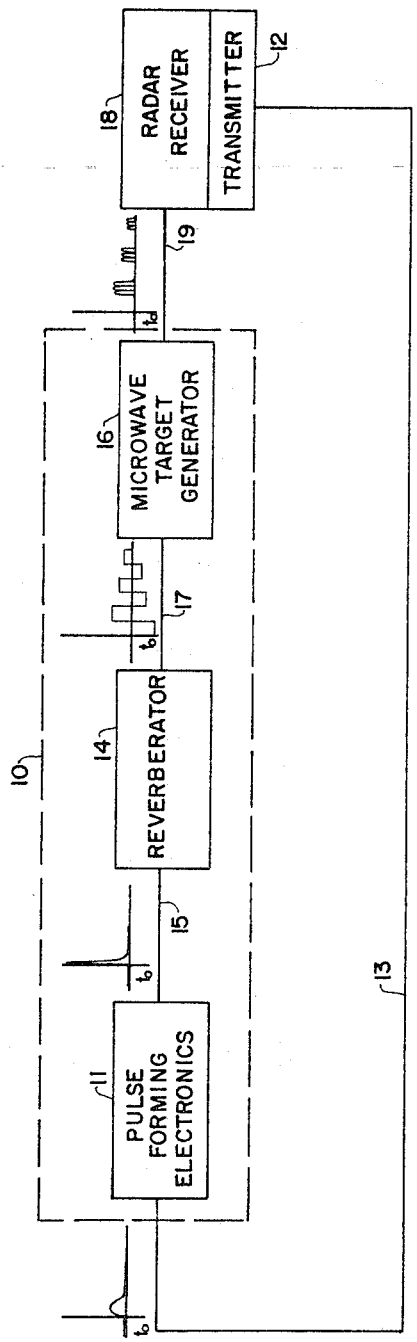
FIG. I
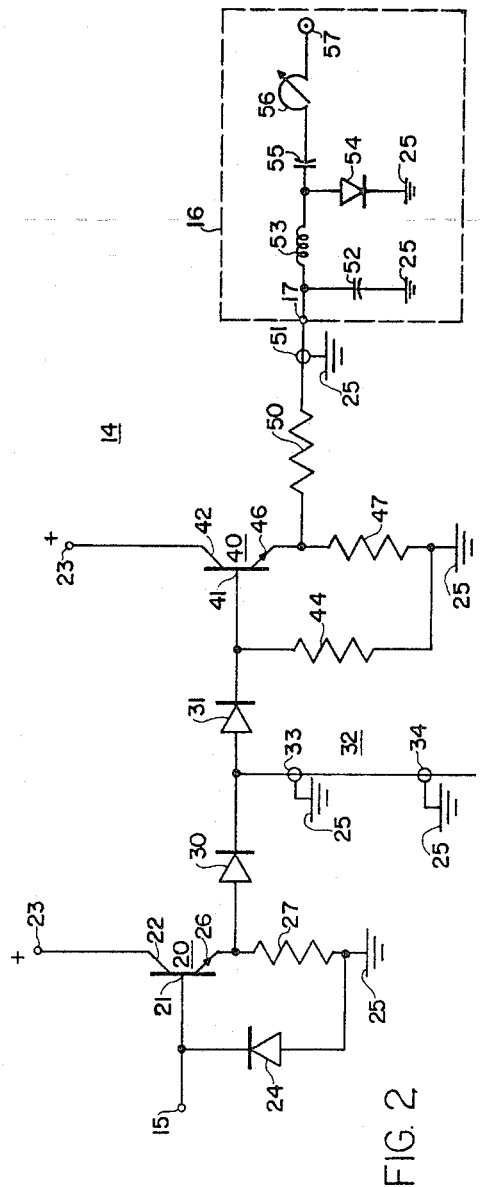
FIG. 2
*INVENTOR.*
ROY E. PEARSON
BY Charles J. Ungemach
ATTORNEY

United States Patent Office 3,278,935
Patented Oct. 11, 1966

3,278,935
APPARATUS FOR CALIBRATING AND TESTING RADAR EQUIPMENT
Roy E. Pearson, Seattle, Wash., assignor to Honeywell Inc., Minneapolis, Minn., a corporation of Delaware
Filed July 13, 1964, Ser. No. 382,181
6 Claims. (Cl. 343—17.7)

The present invention pertains to radar test apparatus and more particularly to apparatus for producing accurately spaced signals, representing radar targets, to be utilized in calibrating and testing radar equipment.

In prior art devices the production of accurate simulated radar targets required complicated oscillator circuits, echo boxes, and delay lines which must be extremely stable so that the reproducibility of a target at a predetermined time is insured. These devices are extremely complicated to repair and difficult to operate. Also, if the electrical characteristics of some of the parts change slightly the range of the output targets can change with no outward indication that difficulty has occurred. It can be seen that only a periodic calibration of the test equipment itself can rectify these difficulties.

In the present invention timing pulses are obtained from the radar transmitter itself and these timing pulses are acted upon by electronic circuits to produce a high amplitude rapidly rising pulse of energy which is applied to a pulse producing means. The pulse producing means produces a series of pulses for each of the energy pulses applied thereto. Each of the pulses in this series of pulses is accurately spaced because of the method of production.

The accurately spaced pulses are then applied to a microwave target generator assembly which is in turn connected to the input of the radar receiver. The microwave target generator assembly consists of a diode switch, a D.C. blocking capacitor, and a 180° phase shifter. These components terminate the pulse producing means and the input of the radar receiver in their characteristic impedances. The diode component contained in the microwave target generator assembly operates as a switch and substantially changes the terminating impedance of the radar receiver input when a pulse is applied to the microwave target generator assembly from the pulse producing means.

The radar receiver contains a mixer having two inputs. Attached to one of the inputs, during normal operation, is the radar antenna and attached to the other input is a local oscillator which provides a continuous and constant frequency. In the present embodiment the RF frequency of the radar transmitter and the frequency of the local oscillator are identical. The operation of the transmitter is such that short bursts of RF energy are transmitted at a predetermined repetition rate and the start of each of these bursts of energy is designated $T_0$.

Thus, in normal operation when a target is within range the receiver antenna receives a return signal from the target at some time subsequent to $T_0$ which appears as a burst of reflected burst RF energy. Since the RF frequency of the transmitter and the frequency of the local oscillator are identical, when the two signals are applied to the mixer an output signal indicative of the phase shift between the two signals is produced. The output signal is operated upon electronically to produce a single polarity pulse. This pulse occurs at a time subsequent to $T_0$ which is indicative of distance of the target from the radar.

In normal operation a small amount of the local oscillator signal leaks through the mixer to the receiver antenna. This local oscillator signal is utilized in the present invention. However, in the event that this leakage is undesirable and is therefore eliminated in the radar receiver a small probe may be placed in the local oscillator to provide a small amount of the local oscillator signal for test purposes. The explanation of the present invention is based upon the assumption that a sufficient amount of local oscillator signal is leaking through the mixer to the antenna. This assumption is made for simplicity and should not be construed as limiting the present invention to that embodiment. Local oscillator leakage levels as low as 70 dbm are adequate to operate this invention. Therefore this invention is capable of being used with almost all radars having a local oscillator leakage greater than this.

In the present invention the antenna is temporarily removed from the radar receiver and the receiver input is terminated in the microwave target generator assembly, previously explained. The microwave target generator assembly normally terminates the radar receiver in its characteristic impedance and, therefore, all of the local oscillator signals leaking through the mixer to the input pass into the microwave target generator assembly where they are completely absorbed. However, each time the microwave target generator assembly receives a pulse from the pulse producing means a diode in the assembly is switched, or shorted, substantially changing the terminating impedance of the radar receiver input. When the terminating impedance of the radar receiver input is changed the local oscillator signals are no longer absorbed in the assembly but instead are reflected back into the mixer of the radar receiver. Since the local oscillator signals are reflected back to the receiver only when pulses are applied to the microwave target generator assembly from the pulse producing means the apparent effect on the radar receiver is a reception of bursts of RF energy. These bursts of RF energy appear as targets and since the pulses produced by the pulse producing means are accurately spaced the apparent targets in the radar receiver will be accurately spaced.

Thus, a radar test apparatus has been disclosed which provides accurately spaced targets for calibrating and testing radar utilizing only inputs from the radar for timing and production of the radar targets.

It is a primary object of this invention to provide an improved control apparatus.

It is a further object of this invention to provide a new and simplified radar test apparatus.

It is a further object of this invention to provide a radar test apparatus utilizing only inputs from the radar being tested.

These and other objects of this invention will become apparent from the following description of a preferred form thereof, and the accompanying specification, claims, and drawings of which:

FIGURE 1 is a block diagram of the present invention; and

FIGURE 2 is a schematic diagram of one embodiment of a pulse producing means.

In FIGURE 1 the numeral 10 designates the radar test apparatus. The radar test apparatus 10 comprises three different components, a pulse forming electronics unit 11, a reverberator 14, and a microwave target generator assembly 16. Pulse forming electronics unit 11 receives an input signal from a radar transmitter 12 on a lead 13. The input signal from transmitter 12 is a portion of the transmitted energy and starts at time $T_0$, as illustrated in the small wave form sketched at the input to pulse forming electronics unit 11. The output pulse from unit 11 is applied through a lead 15 to a pulse producing means, which in this embodiment is illustrated as reverberator 14. It should be understood that reverberator 14 may take other forms and is not to limit the scope of this invention in any way. The output of reverberator 14 is applied to the input of a microwave target generator assembly 16 on a coaxial lead 17. Microwave target generator assembly 16 also functions as a variable terminating impedance for a radar receiver 18 to which it is connected by a transmission line 19.

The signal from transmitter 12 received by unit 11 is shaped into a high, fast pulse as illustrated in the wave form sketch at the input to reverberator 14. This pulse of energy operates to excite reverberator 14 and provide a series of accurately spaced pulses, as shown in the wave form sketch at the output of the reverberator 14.

A schematic diagram of reverberator 14 is illustrated in FIGURE 2. In FIGURE 2 the input lead 15 of reverberator 14 is connected to the base 21 of a transistor 20. The collector 22 of transistor 20 is attached directly to a positive voltage source 23. The base 21 of the transistor 20 is also connected to ground 25 through a diode 24. The diode 24 is connected so that current will flow from ground 25 through diode 24 to the input 15. The emitter 26 of transistor 20 is connected to ground 25 through a resistor 27. Also connected to the emitter 26 of transistor 20 is one side of a diode 30. The other side of the diode 30 is connected to one side of a diode 31. The other side of diode 31 is connected to the base 41 of a transistor 40. Diodes 30 and 31 are connected in series between the emitter 26 of transistor 20 and the base 41 of transistor 40 in a manner to allow current to flow from emitter 26 to base 41.

A reverberating line 32 is connected to a junction point between diode 30 and diode 31. The reverberating line 32 consists of a predetermined length of video transmission line which is open, i.e., not connected, at one end. In FIGURE 2 the outer portion of the transmission line is illustrated simply by rings 33 and 34 at either end of the line. Both rings 33 and 34 are shown connected to ground 25 and it will be understood that the outer portion of the transmission line is grounded at both ends to reduce the effects which would occur between the outer portion of the line and ground if it were not grounded adequately.

The collector 42 of transistor 40 is connected directly to the positive voltage source 23. The base 41 of transistor 40 is connected to ground 25 through a resistor 44. The emitter 46 of transistor 40 is connected to ground through a resistor 47. A resistor 50 is connected at one end to the emitter 46 of transistor 40 and is connected at the other end to output lead 17 of the reverberator 14. The output 17 is illustrated as shielded by the symbol designated 51 and the shielding is connected to ground 25.

Transistor 20 and its associated circuitry act to match the impedance of the reverberating line 32 with that of the output of unit 11. Transistor 40 with its associated electronics acts to match the impedance of the reverberating line 32 to the microwave target generator assembly 16. When a high energy pulse is applied to input lead 15 of the reverberator 14 transistor 20 conducts and a pulse appears across resistor 27 which is approximately the same amplitude and speed as the input pulse. The pulse appearing across resistor 27 passes through diode 30 and is applied to one end of the reverberating line 32. Two methods of providing an oscillatory signal from an open end transmission line are well-known in the art. One of these methods is the charging of the open end line through a charging resistor which is smaller than the characteristic resistance of the line and the other method is the discharging of the open end line through a load resistor which is smaller than the characteristic resistance of the line. In the present invention the method of charging the open end line is utilized but it should be noted that either of the methods could be used to obtain the same effect.

When reverberating line 32 is activated by a pulse appearing across resistor 27 the energy from the pulse is reflected back and forth in the open end line several times. The length of the line determines the time required for each reflection and, thus, the frequency of oscillation of the output signal. This reflection of the energy in the reverberating line 32 provides an oscillatory signal at the base 41 of transistor 40. Transistor 40 operates to provide a signal of approximately the same amplitude and shape across the resistor 47. The signal appearing across resistor 47 appears at the output lead 17 and is applied to microwave target generator assembly 16.

Microwave target generator assembly 16 is shown in detail in FIGURE 2. Contained in assembly 16 is a low pass filter comprising a shunt capacitor 52 and a series coil 53 which are attached to the output lead 17 of reverberator 14. The low pass filter is provided to prevent leakage of the radar receiver local oscillator signal to the test assembly. Assembly 16 also contains a shunt diode 54 which conducts, upon reception of positive portions of the oscillatory signals from the reverberator 14, thereby changing the impedance presented to the radar receiver local oscillator signals, causing them to be reflected back into the receiver and in effect modulating the positive position of the reverberator signal with the local oscillator frequency. The remainder of assembly 16 contains a D.C. blocking capacitor 55, a phase shifter 56, and a termination device 57 and matches transmission line 19 to the previously mentioned components in assembly 16. The D.C. blocking capacitor 55 prevents the reversed D.C. bias applied to the switching diode from being shorted by resonant matching stubs located in the receiver arm of the mixer.

A 90 to 270 degree phase shifter 56 is employed to provide an adjustable means of locating the diode switch 54 at the electric field (E) maximum in the microwave target generator assembly 16. This is necessary because different receiver arms will have different cable or waveguide lengths.

Thus, each time transmitter 12 is pulsed a signal is applied to pulse forming electronics unit 11 which in turn produces a sharp pulse of high amplitude. This pulse is applied to reverberator 14 which in turn produces an oscillatory signal, or series of pulses, for each pulse applied thereto. The series of pulses from reverberator 14 are applied to microwave target generator assembly 16. Also applied to microwave target generator assembly 16 is a continuous frequency signal from the localizer oscillator of radar receiver 18. This continuous frequency signal is normally substantially absorbed in assembly 16. However, each time a positive pulse from reverberator 14 is applied to assembly 16 the terminating impedance presented to radar receiver 18 is substantially changed for the duration of the pulse and, therefore, the continuous frequency signal from the radar receiver local oscillator is reflected back into the receiver for the duration of the pulse. The signal reflected back to the receiver appears as a series of accurately spaced targets which may be utilized to calibrate or test the radar.

Thus, the present apparatus is capable of producing accurately spaced radar targets utilizing only input signals from the radar being tested.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. Apparatus for calibrating and testing a radar having a transmitter output pulsating at a predetermined repetition rate and a receiver input and local oscillator output comprising:

(a) pulse forming means, receiving a portion of said transmitter output and producing pulses therefrom at the same repetition rate;

(b) reverberating means, receiving said pulses from said pulse forming means and producing a series of accurately spaced pulses from each of said received pulses;

(c) variable load means, connected to said input of said receiver and receiving said receiver local oscillator output; and, (d) means receiving said spaced pulses from said reverberating means and connected to said load means in a manner to substantially change the impedance of said load means for the duration of each of said spaced pulses, thereby modulating said spaced pulses with said local oscillator output and reflecting said modulated pulses into said receiver input.

2. Radar calibrating and testing apparatus comprising:

(a) pulse forming means, adapted to receive timing signals from said radar and producing pulses therefrom;

(b) pulse producing means, connected to receive said pulses from said pulse forming means and producing a series of accurately spaced pulses for each pulse received;

(c) variable terminating means, connected to said radar for normally terminating the input in its characteristic impedance; and, (d) means connected to receive said spaced pulses from said pulse producing means and also connected to said terminating means for substantially changing the impedance of said terminating means for the duration of each of said spaced pulses, said changed impedance causing reflections back into said radar which appear as accurately spaced targets.

3. Radar calibrating and testing apparatus comprising:

(a) a radar having a transmitter pulsating at a predetermined repetition rate and a receiver with an input and a local oscillator;

(b) pick-off means for obtaining a portion of the output of said transmitter;

(c) pulse forming means, receiving said portion of the transmitter output from said pick-off means and producing pulses having the same repetition rate therefrom;

(d) reverberating means, receiving said pulses from said pulse forming means and producing a series of accurately spaced pulses from each of said received pulses;

(e) variable load means, connected to said input of said receiver and receiving signals from said local oscillator; and (f) means receiving said spaced pulses from said reverberating means and connected to said load means in a manner to substantially change the impedance of said load means for the duration of each of said spaced pulses, thereby modulating said spaced pulses with said local oscillator signals and reflecting said modulated pulses into said receiver input.

4. Radar calibrating and testing apparatus comprising:

(a) a radar transmitter, having an output pulsating at a predetermined repetition rate;

(b) pulse forming means, receiving a portion of said transmitter output and providing therefrom pulses having the same repetition rate;

(c) pulse producing means, connected to receive said pulses from said pulse forming means and producing a series of accurately spaced pulses from each pulse received;

(d) a radar receiver, having an input and a local oscillator producing a constant frequency signal;

(e) variable terminating means, connected to said input of said radar receiver for normally terminating said input in its characteristic impedance and absorbing substantially all of said local oscillator signal appearing at said input; and (f) means receiving said spaced pulses from said pulse producing means and connected to said terminating means for substantially changing the impedance of said terminating means for the duration of each of said spaced pulses, said changed impedance causing said terminating means to reflect said local oscillator signals back into said radar receiver and appear as accurately spaced targets.

5. Radar calibrating and testing apparatus comprising:

(a) a radar transmitter, having an output pulsating at a predetermined repetition rate and oscillating at a given frequency;

(b) pulse forming means, receiving a portion of said transmitter output and providing therefrom pulses having the same repetition rate;

(c) pulse producing means, connected to receive said pulses from said pulse forming means and producing a series of accurately spaced pulses from each pulse received;

(d) a radar receiver, having an input and a local oscillator producing a signal at substantially the same frequency as said transmitter;

(e) variable terminating means, connected to said input of said radar receiver for normally terminating said input in its characteristic impedance and absorbing substantially all of said local oscillator signal appearing at said input; and, (f) means receiving said spaced pulses from said pulse producing means and connected to said terminating means for substantially changing the impedance of said terminating means for the duration of each of said spaced pulses, said changed impedance causing said terminating means to reflect said local oscillator signals back into said radar receiver and appear as accurately spaced targets.

6. Apparatus for calibrating and testing a receiver having a signal input means with a characteristic impedance and a local oscillator, a portion of the local oscillator signal normally leaking through the receiver input means, comprising in combination:

a variable terminating means, connected to the receiver input, normally terminating the receiver input in the characteristic impedance thereof, thus substantially absorbing the total local oscillator leakage signal; and, a source of timing signals, connected to said terminating means, the terminating means responsive to the timing signals to vary the effective impedance of said terminating means accordingly, the variation in impedance causing a portion of the local oscillator leakage signal to be reflected back to the receiver, the reflected portion serving as a test and calibration signal.

References Cited by the Examiner

UNITED STATES PATENTS

| | | | |
|---|---|---|---|
| 2,505,525 | 4/1950 | Clapp | 343—17.7 |
| 2,532,539 | 12/1950 | Counter | 343—17.7 |
| 2,917,716 | 12/1959 | Dalle Mura. | |
| 3,090,955 | 5/1963 | Hubka | 343—17.7 |

CHESTER L. JUSTUS, *Primary Examiner.*

RODNEY D. BENNETT, *Examiner.*